United States Patent [19]
Thuries et al.

[11] Patent Number: 5,571,989
[45] Date of Patent: Nov. 5, 1996

[54] GAS-INSULATED HIGH-TENSION LINE FOR LONG DISTANCES

[75] Inventors: Edmond Thuries; Van Doan Pham, both of Meyzieu; René Tixier, Lyon; Marcel Guillen, Pont-Eveque, all of France

[73] Assignee: GEC Alsthom T & D SA, Paris, France

[21] Appl. No.: 359,991

[22] Filed: Dec. 20, 1994

[30] Foreign Application Priority Data

Dec. 21, 1993 [FR] France ................................ 93 15355

[51] Int. Cl.$^6$ ........................................................ H02G 5/06
[52] U.S. Cl. .......................... 174/24; 174/28; 174/68.2; 174/99 B
[58] Field of Search .............................. 174/24, 28, 15.6, 174/16.2, 68.2, 16.1, 99 B

[56] References Cited

U.S. PATENT DOCUMENTS

| | | | |
|---|---|---|---|
| 3,652,778 | 3/1972 | Sakai | 174/28 |
| 3,730,968 | 5/1973 | Szente-Varga | 174/27 |
| 3,767,837 | 10/1973 | Graybill | 174/27 |
| 4,161,621 | 7/1979 | Bolin et al. | 174/14 R |
| 4,316,052 | 2/1982 | Matsuda | 174/14 R |
| 4,458,100 | 7/1984 | Cookson et al. | 174/28 |
| 5,089,665 | 2/1992 | Thuries | 174/27 |

FOREIGN PATENT DOCUMENTS

| | | | |
|---|---|---|---|
| 0423665A1 | 4/1991 | European Pat. Off. | 174/27 |
| 0573338A1 | 12/1993 | European Pat. Off. | |
| 2132646 | 11/1972 | France | 174/99 B |
| 2316100 | 10/1974 | Germany | |
| 3141437A1 | 5/1982 | Germany | |

OTHER PUBLICATIONS

Gaseous Dielectrics II, Proceedings of the 2nd Intl. Symposium on Gaseous Dielectrics, Knoxville, TN, Mar. 9–13, 1980, "Particle Traps in Gas–Insulated Systems", R. W. Afzelius & H. W. Bergqvist.

*Primary Examiner*—Kristine L. Kincaid
*Assistant Examiner*—Chau N. Nguyen
*Attorney, Agent, or Firm*—Sughrue, Mion, Zinn, Macpeak & Seas

[57] ABSTRACT

A gas-insulated high-tension three-phase electricity line which includes a cylindrical steel case and three conductors disposed parallel to the axis of the case, and a magnetic screen constituted by a cylindrical aluminum case placed inside the steel case and very close thereto. The conductors are held by a plurality of sets of three insulating arms secured to one another, the conductors being free to slide through openings formed in the arms, the aluminum case being separated from the steel case by strips of plastics material or of filled polymer having a low coefficient of friction.

7 Claims, 7 Drawing Sheets

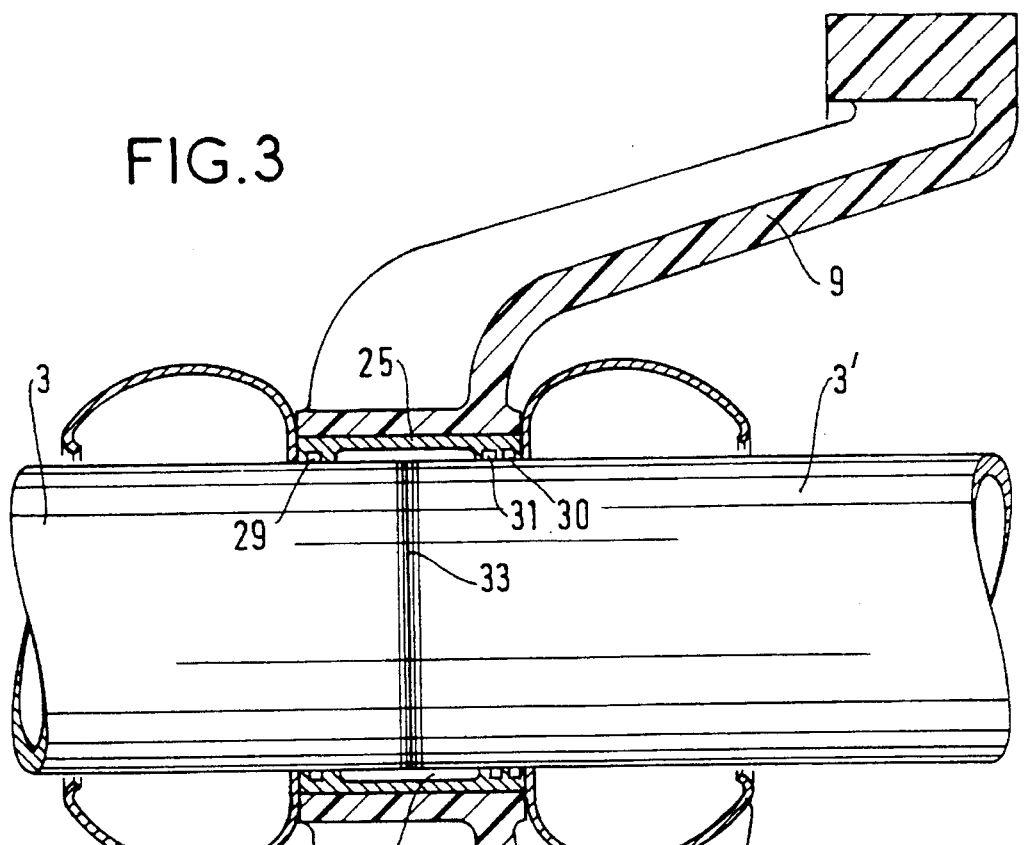
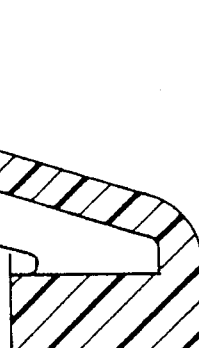
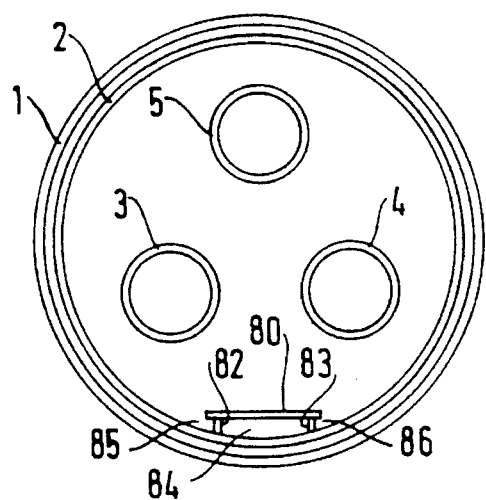
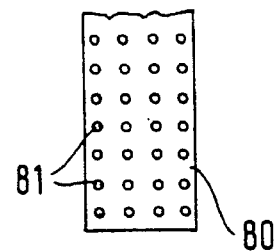

GAS-INSULATED HIGH-TENSION LINE FOR LONG DISTANCES

The present invention relates to transporting electricity by means of a gas-insulated high-tension line (at a voltage greater than or equal to 225 kV), said line comprising a sealed metal case in which conductors are placed, with insulation being provided by a gas.

BACKGROUND OF THE INVENTION

The material used for making the case must be steel, which is preferred over aluminium, since steel withstands internal arcing better and has higher strength against internal pressure, particularly when the insulating gas is nitrogen at a pressure of about 10 hectopascals. In addition, steel is cheaper, easier to protect against corrosion, and easier to weld on site while the line is being installed.

If a steel case is used in AC transport, then heat losses occur in the case because of the electrical currents induced in the steel. It is therefore necessary to insert a magnetic screen between the conductors and the case, which screen may advantageously be a case made of aluminum. In this respect, reference may be made to the article entitled "Particle traps in gas-insulated systems" by R. W. Afzelium et al., Gaseous Dielectrics, Volume II, Pergamon Press.

Most cables that are insulated with sulfur hexafluoride gas ($SF_6$) have a case that is made of aluminum, which is made in 10-meter lengths that are bolted together at each end, with sealing being ensured by gaskets (see Electra No. 94, 1984, for example). The internal conductors are likewise made in 10-meter lengths which are electrically connected to one another by sliding contacts.

The use of flanges and gaskets at each junction between lengths is not economical, particularly for long-distance lines. Risks of gas leakage are increased.

On a long-distance line, the multiplicity of sliding contacts gives rise to a relatively high overall value for contact resistance, which can give rise to heating that is sometimes prohibitive, particularly if the lines are buried.

That is why the Applicant believes that the cheapest solution for making a gas-insulated long-distance high-tension line is to weld together the lengths of case and the lengths of conductor. Welding gives rise to metal swarf appearing, and it is necessary to find ways of removing or at least reducing the effects thereof.

OBJECTS AND SUMMARY OF THE INVENTION

An object of the present invention is to define an electricity line capable of being of great length (several kilometers to several tens of kilometers) which is gas-insulated and which is built up by welding together lengths of case and lengths of conductor, the cost of manufacturing and installing the line being moderate, and the cost of running it being low because of reduced heat losses, the line also being very safe in operation.

The present invention provides a gas-insulated high-tension three-phase electricity line comprising a cylindrical steel case with three conductors disposed parallel to the axis of said case, and with a magnetic screen constituted by a cylindrical aluminium case placed inside the steel case and very close thereto. The conductors are held by a plurality of sets of three insulating arms secured to one another, said conductors being free to slide through openings formed in said arms, the aluminum case being separated from the steel case by strips of plastics material or of filled polymer having a low coefficient of friction.

In an embodiment, the material of said strips is polytetrafluoroethylene, known commercially under the trademark TEFLON.

According to a feature of the invention, the ends of said arms are clamped in pairs between the bolted-together ends of metal hoops.

The ends of the hoops form an upside-down equilateral triangle having a horizontal base on top.

The steel case is made up of case elements of a length lying in the range 5 meters to 12 meters, which elements are welded together end to end.

The aluminum case is made up of case elements each of which is welded to the supporting hoops of a single set of arms.

The conductors are constituted by conductor elements that are welded together end to end.

The arms are provided with respective sleeves each provided with its own groove to define two bearing surfaces that bear against two adjacent conductors, the weld between two conductors being located inside said groove.

Each metal sleeve of the insulating arms is provided with an electrical contact and with gaskets on either side of its groove.

The hoops are located close to the weld between the steel cases.

According to another characteristic of the invention, the electricity line is made up of factory-assembled compartments, each compartment comprising a steel case element of length lying in the range 5 meters to 12 meters, an aluminum case element of equal length to the steel case, three conductor elements of equal length to said cases, and a set of support arms and of hoops, which set is secured to one end of said aluminum case.

A plurality of compartments are connected together to form a length of line, the end of the length of line being provided with means for injecting and for purging gas, with means for sealing the length of line, with means for allowing the conductors and the cases to expand freely, and with means enabling two adjacent lengths of line to be disassembled.

BRIEF DESCRIPTION OF THE DRAWINGS

The invention will be well understood on reading the following description of a preferred embodiment, given with reference to the accompanying drawings, in which:

FIG. 3 is a fragmentary view on a larger scale showing a conductor support arm;

FIG. 4 is a cross-section through a line of the invention;

FIG. 5 is a plan view of a grid used in a line of the invention;

MORE DETAILED DESCRIPTION

Figure 1:
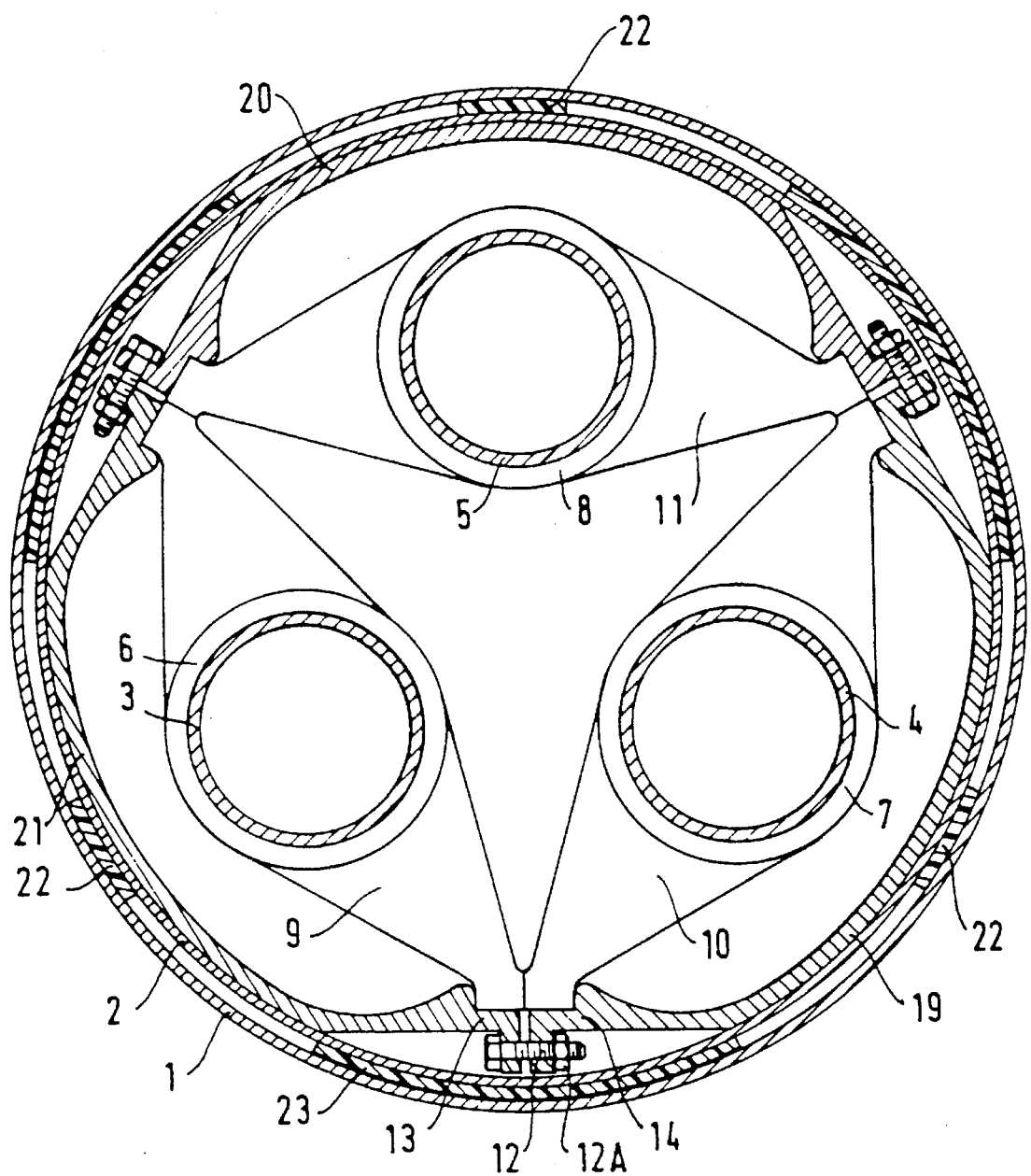
FIG. 1 is a cross-section view through a line of the invention.

In FIG. 1, references 3, 4, and 5 designate three conductors in the form of tubes of aluminum or of copper that are disposed parallel to one another and that are held in respective openings 6, 7, and 8, formed in insulating arms 9, 10, and 11. The ends of the arms are clamped in pairs in jaws such as 13 and 14 constituting the ends of arcuate metal "bows" or "hoops" 19, 20, and 21; the jaws are clamped together by nuts 12A and bolts 12. The ends of the hoops form an "upside-down" equilateral triangle, i.e. having a horizontal base on top.

Figure 2:
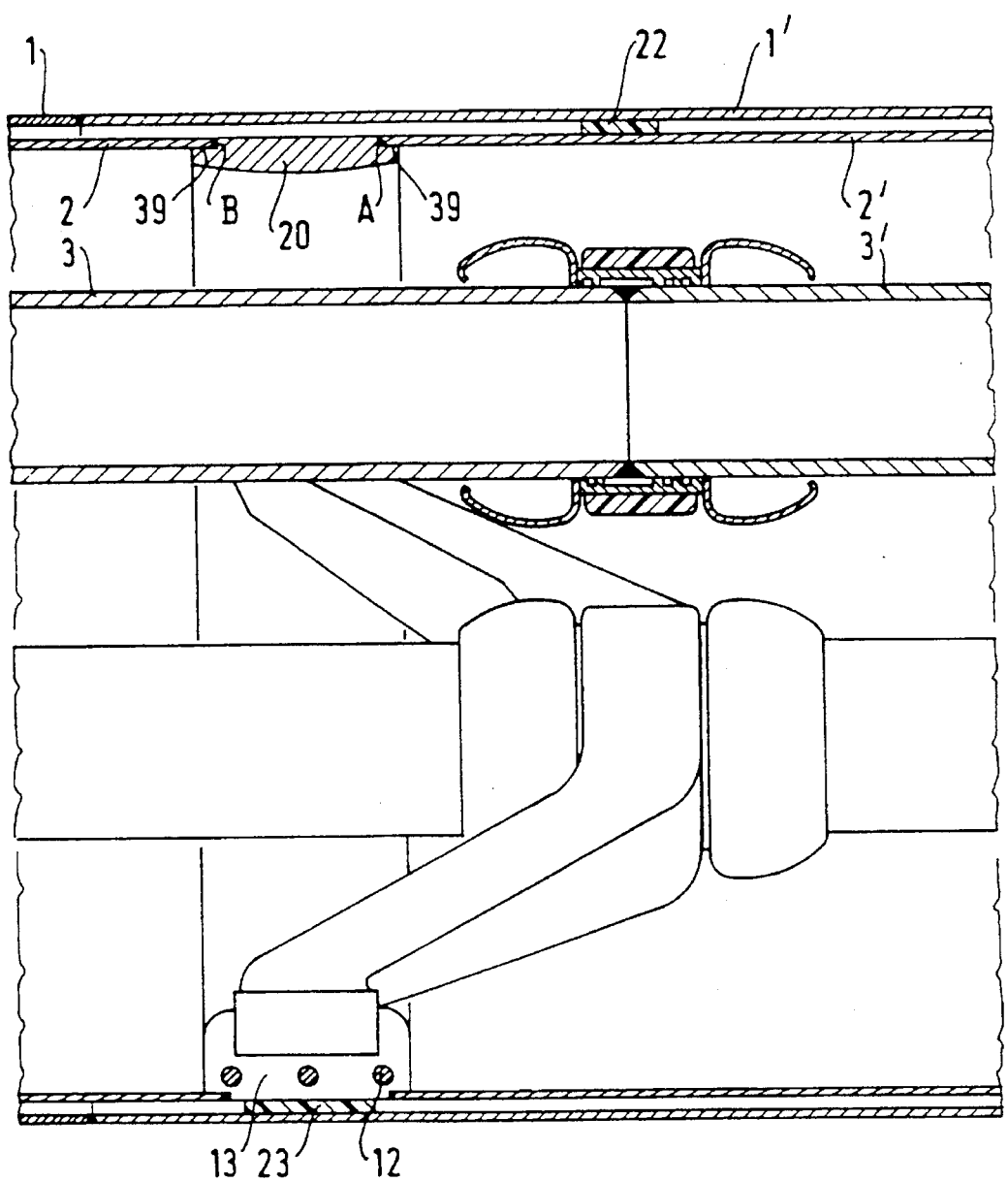
FIG. 2 is an axial section view through a portion of a line of the invention.

The set of conductor support members thus forms a compact assembly (see also FIG. 2). The aluminum case 2 is slidably mounted inside a steel case 1 on strips 22 of a plastics material or of a filled polymer that has a low coefficient of friction and adequate hardness, for example polytetrafluoroethylene also known under the registered trademark "TEFLON".

Relative to the steel case 1, the aluminum cases act as a magnetic screen serving to reduce the heating of the steel case.

The TEFLON resin strips enable the aluminum cases to slide relative to the steel case in the event of differential expansion in operation, and also while the line is being assembled.

Other TEFLON resin strips such as 23 may optionally be placed overlying the ends of the arms so as to enable the aluminum case 2 to be centered relative to the steel case 1.

The hoops 19, 20, and 21 are rounded in shape so as to obtain good dielectric behavior relative to the conductors.

The aluminum casing is built up from cylindrical tube elements such as 2 and 2' (FIG. 2) whose ends A and B are received in grooves 39 in the hoops 19, 20, and 21, and are then welded to said hoops. This disposition makes it possible, during welding, to avoid injecting metal particles into the inside volume of the case 2. In contrast, it does not matter if particles are injected into the space between the cases 1 and 2 or into the space between cases 1' and 2' during welding of the steel case elements 1 and 1' since the steel case and the aluminum case are at practically the same potential, namely ground potential.

FIG. 3 shows that the openings in the conductor support arms, such as the arms 9, are provided internally with respective metal sleeves 25 that are secured to the corresponding arms.

The sleeve 25 includes a groove 32 defining two bearing surfaces provided with gaskets 29 and 30 that co-operate with respective ones of two adjacent conductor elements 3 and 3'. The groove 32 between the bearing surfaces serves to trap dust generated by rubbing between the parts during thermal expansion.

An electrical contact 31 inside the sleeve 25 ensures electrical contact between the conductor 3' and the sleeve 25.

The conductor elements 3 and 3' are welded together around a circle 33. The weld is hidden inside the groove 32 to provide better dielectric performance.

Two anti-corona rings 37 and 38 are fixed or welded to the sleeve 25 and serve to reduce dielectric stresses.

The jaws 13, 14 and the fastening means 12, 12A lie on a vertical axis through the line, i.e. in the bottom portion of the case (see FIG. 1). This makes it possible for dust and metal particles to remain in a region of weak electric field. This avoids strong attraction between the particles and the conductors 3 and 4.

In order to trap particles, it is possible to use a trap constituted by a metal plate 80 (FIG. 5) perforated by holes 81 and placed on the bottom portion of case 2 between two lines of hoops.

The plate 80 stands on legs 82, 83 (see FIG. 4).

Unattached metal particles fall into the space 84 through the holes 81 or through the side slots 85 and 86.

The space 84 beneath the plate 80 can be used for housing optical fibers used as sensors or as media for conveying data along the three-phase line.

The line components, i.e. the conductors, the aluminum case, and the steel case are manufactured in lengths lying in the range 5 meters to 12 meters, and preferably in 10-meter lengths. These parts are welded together end-to-end in order to make up a length of line that is about 50 meters to 150 meters long, and that is preferably about 100 meters long. The ends of the length of line are provided with special components to seal off each length of line from the adjacent lengths of line and to solve problems associated with differential expansion of the component parts.

FIGS. 6A to 6D show a first way of making up the line, in which compartments are pre-assembled (preferably in a factory). Each compartment comprises (see FIG. 6A) a steel case element 1, 1', an aluminum case element 2, 2', and conductor elements 3, 3' & 4, 4' (the third conductors are not visible in the figure), with the conductors being supported by arms such as a 9, 10 etc. . . . , and being capable of sliding relative to said arms. The arms are secured to hoops 20, 20', etc. The aluminum case 2' of the righthand compartment is welded at A to the hoops.

The compartments are brought into alignment with each other, the lefthand compartment being arranged so that the conductors 3, 4 project beyond the aluminum case 2 and so that the aluminum case projects beyond the steel case 1. At the beginning of the process whereby the two adjacent compartments are assembled together, the ends of the cases 1' and 2' and the ends of the conductors 3', 4' in the righthand compartments are all in vertical alignment with one another.

Figure 6A:
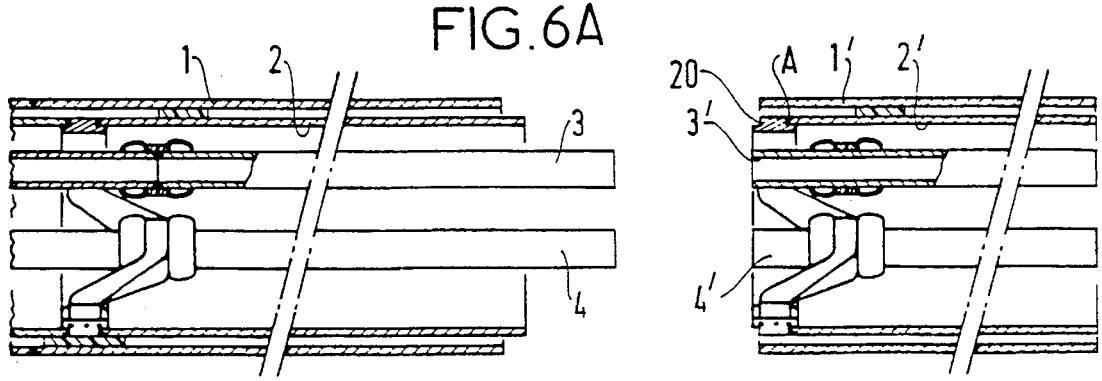
FIGS. 6A to 6D show a first way of constructing a line of the invention.
Figure 6B:
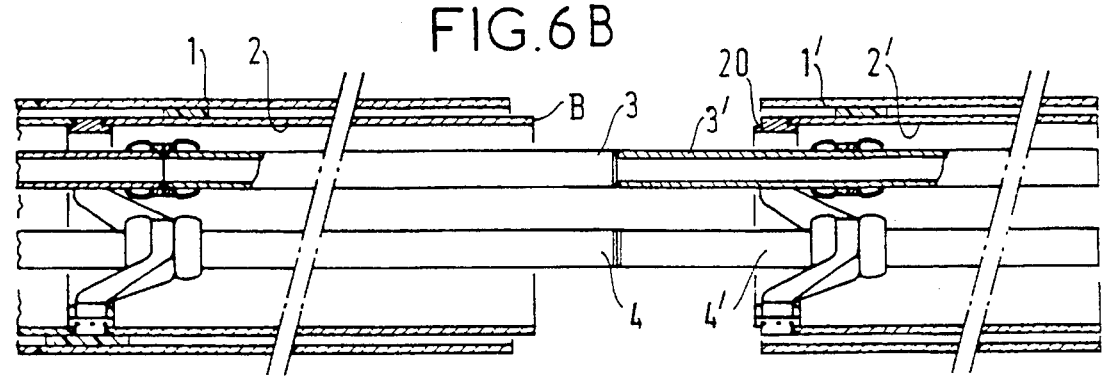

The conductors 3', 4', etc. of the righthand compartment are pulled out so as to be brought into contact with the corresponding conductors of the lefthand compartment, and they are welded together (FIG. 6B).

Figure 6C:
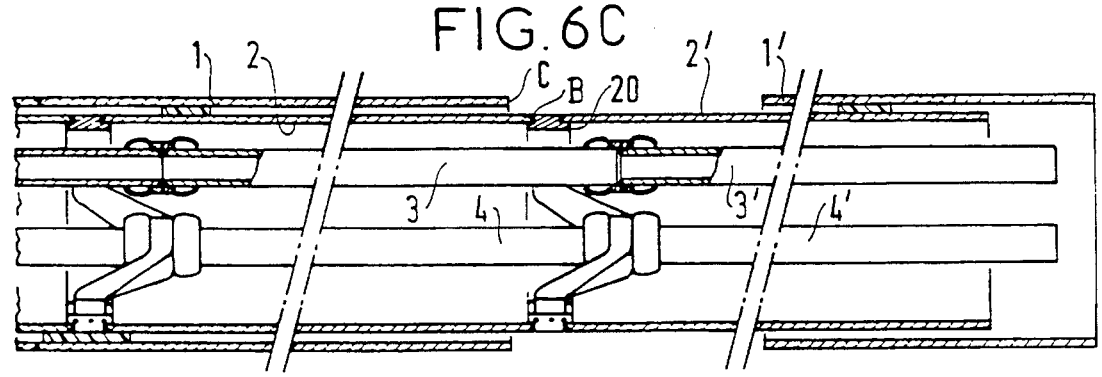
Figure 6D:
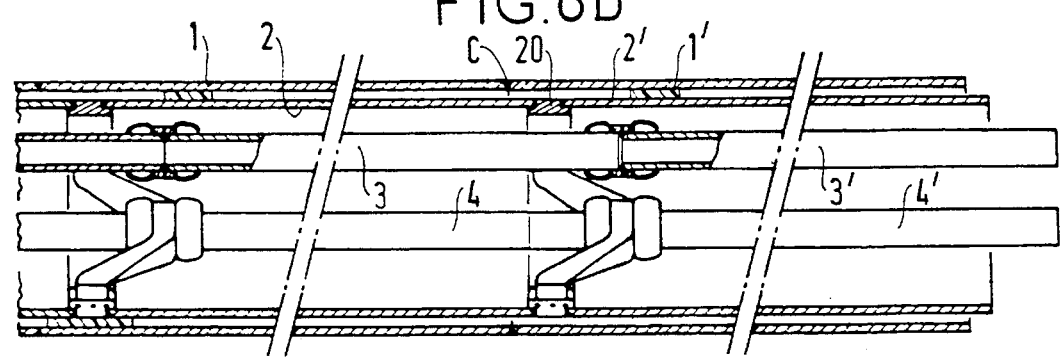

Thereafter the aluminum case 2' secured to groups of arms 9, 10, etc. is likewise pulled out and brought into contact with the aluminum case 2 of the lefthand compartment. The case 2' slides easily inside the steel case 1' because of the TEFLON resin strips. The case 2 is welded to the hoops at B (FIG. 6C).

Finally (FIG. 6D), the steel case 2' of the righthand compartment is pulled in turn so as to be brought into contact with the steel case 2 of the lefthand compartment, and the two cases are welded together.

The operation is repeated until a length of line has been built up (about 50 meters to 150 meters long), and the ends of the length of line are provided with special parts as described below with reference to FIGS. 8A and 8B.

A variant way of building up the line is described with reference to FIGS. 7A to 7E.

Figure 7A:
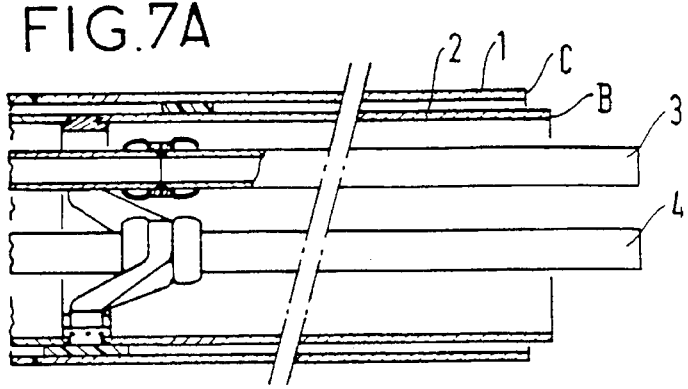
FIGS. 7A to 7E show a variant way of constructing a line of the invention.

An assembled compartment is shown to the lefthand side of FIG. 7A. As before, it comprises a steel case 1, an aluminum case 2 that projects beyond the end of the steel case, and conductors 3, 4, etc. that are supported to the left by arms and optionally also by removable temporary supports (not shown). The conductors project beyond the end of the aluminum case 2.

Figure 7B:
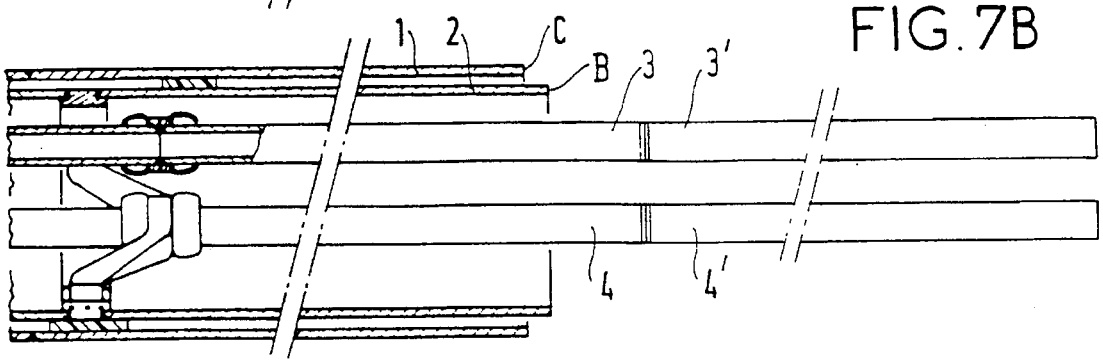

Conductors 3', 4', etc. are brought up to and welded to respective ones of the conductors 3, 4, etc. (FIG. 7B).

Figure 7C:
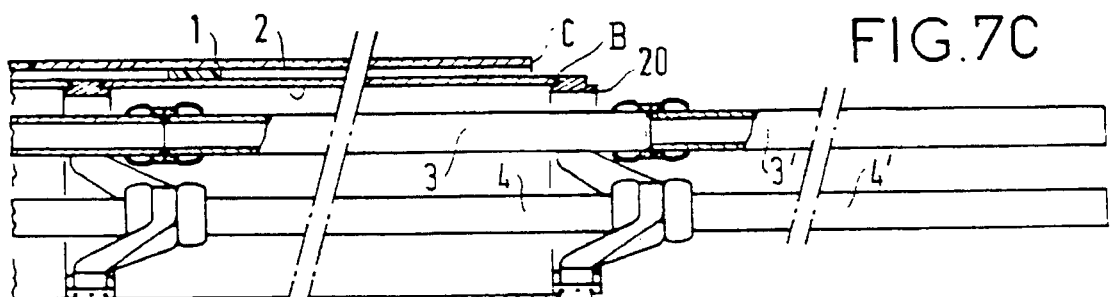

A block constituted by arms associated with hoops, is threaded over the conductors 3', 4', etc. . . . and brought into contact with the end B of the aluminum case 2. The aluminum case 2 is welded to the hoops at B (FIG. 7C).

Figure 7D:
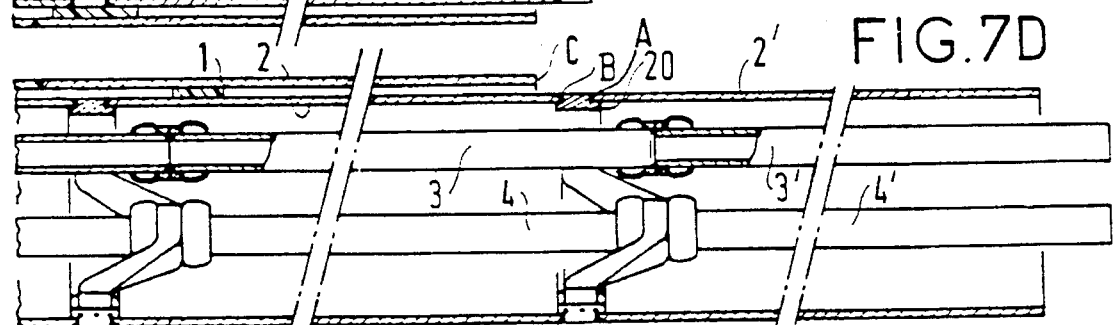
Figure 7E:
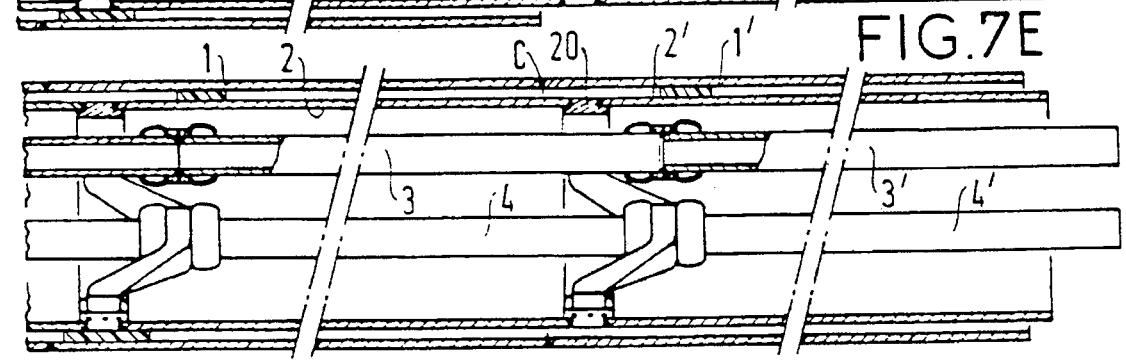

An aluminum case 2' is engaged around the conductors 3', 4', etc. . . . , and its end A is brought into contact with the hoops, and it is welded thereto (FIG. 7D).

Finally, a steel case 1' is engaged around the aluminum case 2' with TEFLON resin sleeves being interposed therebetween, and it is brought into contact with the steel case 1 at C, and is welded thereto.

The operation is repeated until a line length has been built up, which length is then fitted with special end parts that allow the conductors to expand, that allow two adjacent line lengths to be disassembled, and that ensure that each line length is individually sealed. Reference is made to FIGS. 8A and 8B.

In these figures, references 1', 2', 3', and 4' designate respectively the steel case, the aluminum case, and conductors of the electricity line length shown to the left in the figure, whereas references 1", 2", 3", and 4" designate the corresponding parts of the adjacent length (to the right in the figure).

Figure 8A:
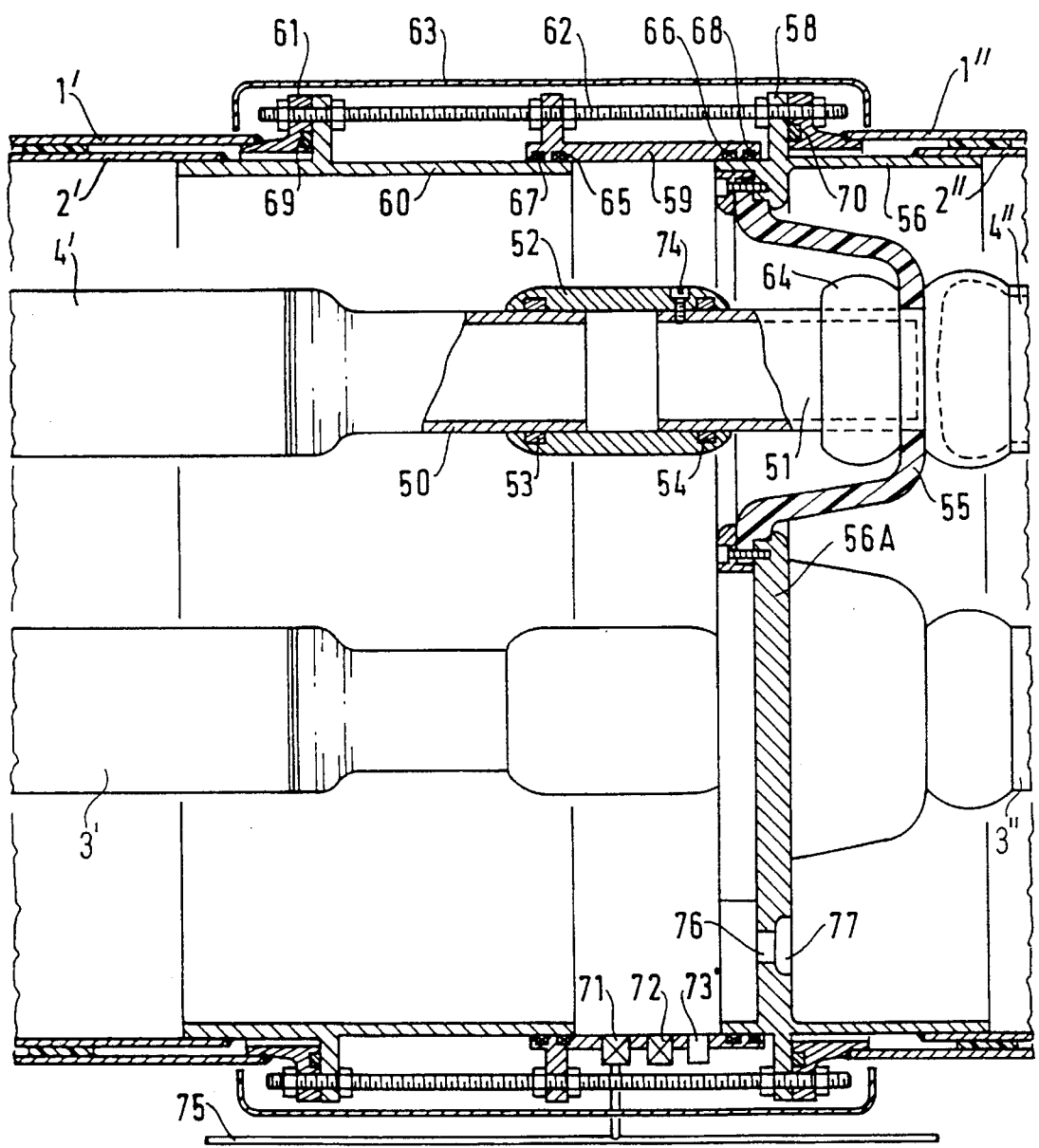
FIGS. 8A and 8B are axial sections through the ends of two lengths of line, respectively in the assembled position and in the disassembled position.

FIG. 8A shows the lefthand length connected to the righthand length in normal operation. It can be seen that the conductors such as 4' and 4" are provided with respective welded-on smaller-section end portions 50 and 51, and that these portions are connected together by contact sleeves 52 provided with sliding contacts 53 and 54. The conductors are thus free to expand without being subjected to lateral deformation. The sleeve 52 may be fixed to the conductor 51 by a locking screw 74.

A flange 61 is welded to the steel case 1' and has bearing thereagainst a metal cylinder 60 that engages inside the aluminum case 2' and is welded thereto.

Similarly, the steel case 1" is welded to a flange 58 which has a metal cylinder 56 bearing thereagainst, which cylinder engages inside the cylindrical case 2", but this time the cylinder 56 and the case 2" slide relative to each other so as to provide play for relative thermal expansion. The cylinder 56 is secured to a transverse plate 56A that is provided with three openings having insulating cones such as the cone 55 bearing against the edges thereof and serving as supports for the conductors 4". The transverse plate serves to seal the righthand length in the figure when said length is separated from the length of line on the left of the figure.

The cylinders 60 and 56 are respectively provided with sliding contacts 65 and 66 that co-operate with a conducting cylinder 59. Sealing is provided by gaskets 67, 68, 69, and 70.

The cylinders 56, 60, and 59 are held in place by threaded rods passing through appropriate flanges; a cover 63 protects the device as a whole.

The cylinder 59 may carry valves (optionally solenoid valves) 71 for injecting insulating gas, 72 for venting it, and also sensors 73 for picking up pressure and for detecting internal arcing.

Gas is supplied either via a duct 75 extending from the steel cases externally, or else in cascade via openings 76 and through filters 77.

Disassembly is performed as follows: while the conductors are not under electrical tension, the cover 63 is removed, the gas supply is closed off, and the gas is vented via the valve 72.

Figure 8B:
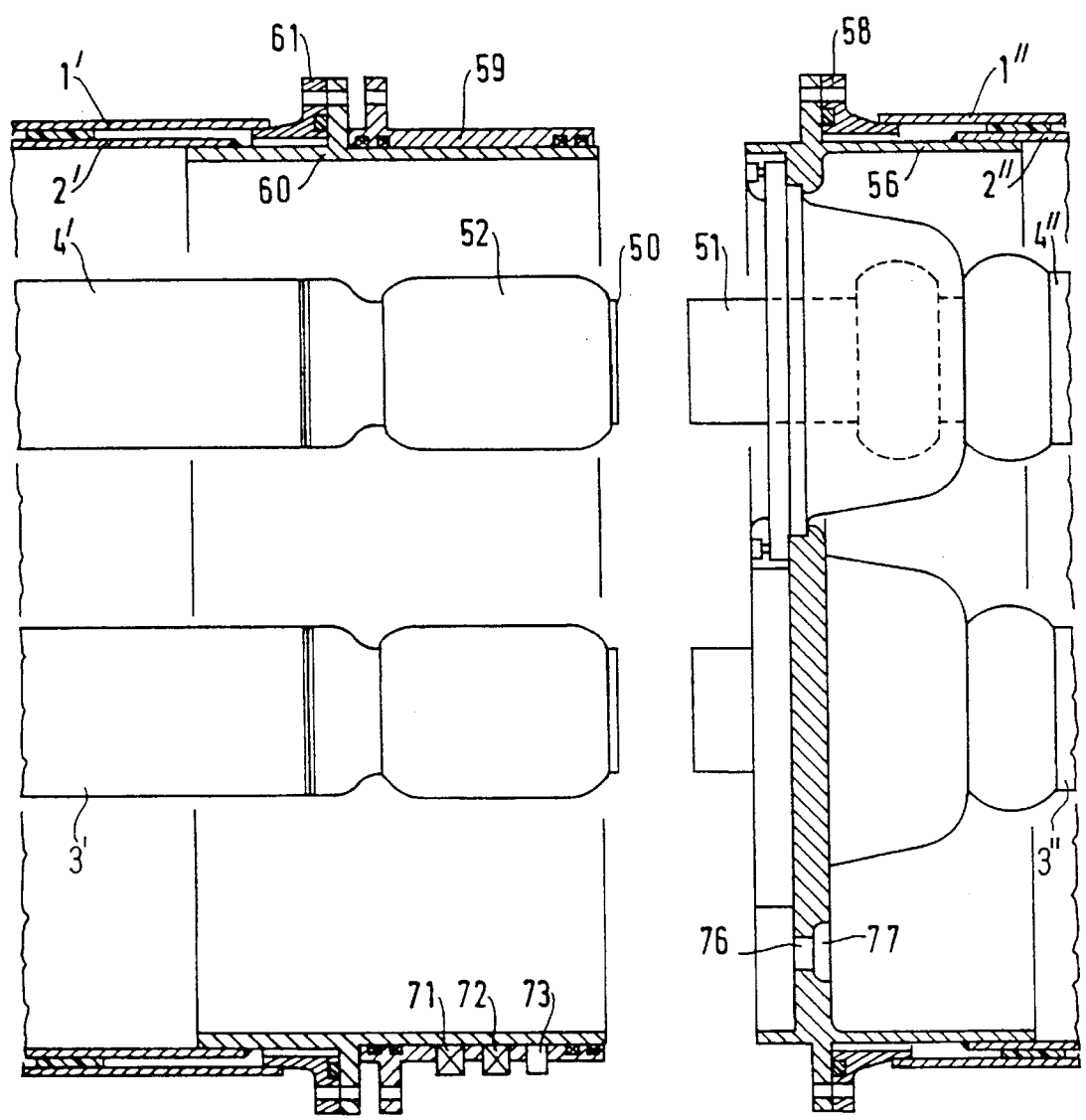

Thereafter the threaded rods 62 are removed and the cylinder 59 is displaced by sliding it to the left (in FIG. 8B).

The contact sleeve 52 is caused to slide to the left after its locking screw 74 has been released. The same is done for the other two phases.

The lefthand length of line is then completely disconnected from the righthand length of line.

It will be observed that the aluminum case can be thick (about 10 mm thick) and therefore capable, in the event of a short circuit, of carrying, without danger, the short circuit current that escapes to ground via the cylinder 56, the flange 58, and the steel tube 1". To achieve considerable savings in the cost of making the line, it is possible to use an aluminum case that is thinner, e.g. only about 4 mm thick. Under such circumstances, it is necessary to use a layer of insulation (not shown in FIG. 8A) to insulate the case 2" of the cylinder 56. The short circuit current will then puncture the aluminum case and escape directly through the steel case without flowing through the aluminum case which would otherwise run the risk of heating and even of melting.

What is claimed is:

1. A gas-insulated high-tension three-phase electricity line comprising a cylindrical steel case and three conductors disposed parallel to a longitudinal axis of said case, and a magnetic screen including a cylindrical aluminum case disposed inside the steel case in close proximity to the steel case, wherein the conductors are held by a plurality of sets of insulating arms, each of said sets comprising three of said arms secured to each other, said conductors being free to slide through openings formed in said arms, the aluminum case being separated from the steel case by strips made of one of a plastic material and a filled polymer having a low coefficient of friction, said line further comprising supporting hoops disposed inside said aluminum case, said hoops being bolted together at ends of said hoops, wherein ends of said arms are clamped in pairs between the ends of said hoops.

2. An electricity line according to claim 1, wherein said strips are made of polytetrafluoroethylene.

3. An electricity line according to claim 2, wherein the ends of the hoops form an upside-down equilateral triangle having a horizontal base on top.

4. An electricity line according to claim 1, wherein the steel case comprises a plurality of case elements each having a length in a range of about 5 meters to about 12 meters, and wherein said case elements are welded together end to end.

5. An electricity line according to claim 1, wherein the aluminum case comprises a plurality of case elements, and each of said case elements is welded to the supporting hoops of one of said sets of arms.

6. An electricity line according to claim 1, wherein the conductors comprise a plurality of conductor elements that are welded together end to end, and wherein the arms have respective sleeves, each of said sleeves having a groove which defines two bearing surfaces that contact adjacent ones of the conductor elements, a weld between the adjacent ones of the conductor elements being located inside said groove.

7. An electricity line according to claim 6, wherein each one of the sleeves has an electrical contact on at least one side of the groove and gaskets on both sides of the groove.

* * * * *